United States Patent [19]

Fagerburg et al.

[11] Patent Number: 5,064,937
[45] Date of Patent: * Nov. 12, 1991

[54] COPOLY(PHENYLENE SULFIDE)

[75] Inventors: David R. Fagerburg; Joseph J. Watkins, both of Kingsport; Paul B. Lawrence, Blountville; Mark Rule, Kingsport, all of Tenn.

[73] Assignee: Eastman Kodak Company, Rochester, N.Y.

[*] Notice: The portion of the term of this patent subsequent to Dec. 20, 2005 has been disclaimed.

[21] Appl. No.: 534,338

[22] Filed: Jun. 6, 1990

Related U.S. Application Data

[63] Continuation of Ser. No. 290,587, Mar. 27, 1989, abandoned.

[51] Int. Cl.$^5$ ................................ C08G 75/14
[52] U.S. Cl. ................................ 528/389; 528/226; 528/377; 528/388
[58] Field of Search ............... 528/388, 389, 226, 377

[56] References Cited

U.S. PATENT DOCUMENTS

| | | | |
|---|---|---|---|
| 4,451,640 | 5/1984 | Shiki et al. | 528/389 |
| 4,605,732 | 8/1986 | Heitz et al. | 528/388 |
| 4,605,733 | 8/1986 | Senatore | 528/359 |
| 4,698,415 | 10/1987 | Sinclair et al. | 528/388 |
| 4,748,169 | 5/1988 | Izutsu et al. | 525/537 |
| 4,786,713 | 11/1988 | Rule et al. | 528/389 |
| 4,792,600 | 12/1988 | Rule et al. | 528/389 |
| 4,826,956 | 5/1989 | Fagerburg et al. | 528/389 |
| 4,840,986 | 6/1989 | Inoue et al. | 528/388 |
| 4,857,629 | 8/1989 | Rule et al. | 528/389 |
| 4,859,762 | 8/1989 | Rule et al. | 528/389 |

FOREIGN PATENT DOCUMENTS 225-218-A 10/1986 Japan .
293-225-A 12/1986 Japan .
231-030-A 10/1988 Japan .

Primary Examiner—Melvyn I. Marquis
Assistant Examiner—David W. Woodward
Attorney, Agent, or Firm—Charles R. Martin; Wm. P. Heath, Jr.

[57] ABSTRACT

A process for preparing a polymer having repeating units corresponding to the structure

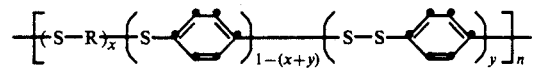

wherein y is in the range of 0.005 to 0.15, x is in the range of 0.02 to 0.25, n is at least 200, and R a divalent aromatic radial. The polymer is prepared by reacting a diiodoaromatic compound and elemental sulfur.

2 Claims, No Drawings

COPOLY(PHENYLENE SULFIDE)

This is a continuation of copending application Ser. No. 07/29,0587 filed on Mar. 27, 1989 now abandoned.

The invention relates to a copoly(phenylene sulfide) containing aromatic radicals in the chain. The aromatic radicals are contributed by a diiodo aromatic compound.

Copolymers of poly(phenylene sulfide) and other aromatic radicals are known in the art. Japanese Patent J6 1231-030-A discloses copolymers of PPS with 1 to 5 mol % of biphenylene or triphenylene units. Japanese Patent J6 1225-218.A disclosed a copolymer with sulfone groups which is said to be a block copolymer. Japanese Patent J6 1293-225-A discloses poly(phenylene sulfide) containing biphenyl units.

Copoly(phenylene sulfide) polymers prepared by heating a diiodoaromatic compound in the presence of elemental sulphur have been recently discovered and are disclosed in U.S. patent application Ser. No. 117,722. These polymers can be described as corresponding to the structure

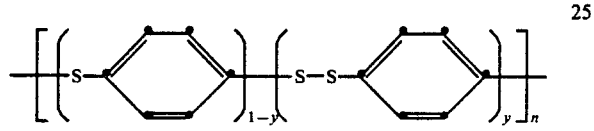

where y is in the range of 0.5 to 0.001.

We have now discovered that small amounts of an aromatic radical can be incorporated into this polymer to produce a polymer which exhibits an unexpected combination of ability to product oriented articles with improved properties from polymers that are amorphous upon cooling from the bulk.

The polymer of this invention can be described as having repeating units corresponding to the structure

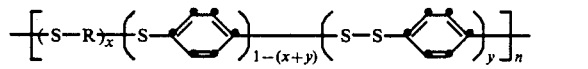

wherein y is in the range of 0.005 to 0.15, x is in the range of 0.02 to 0.25, n is at least 200, and R a divalent aromatic radial selected from

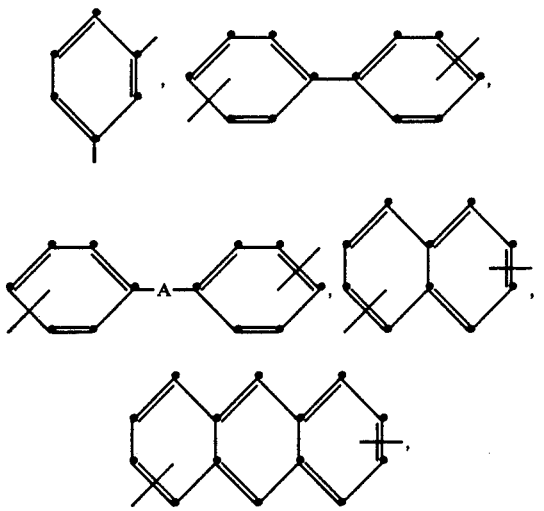

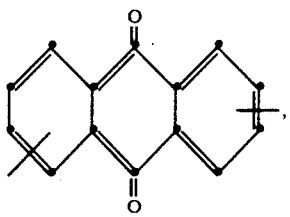

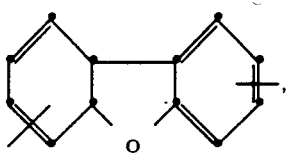

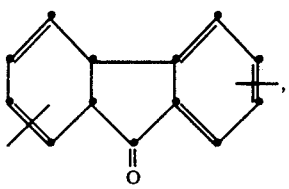

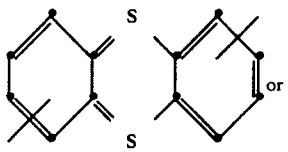

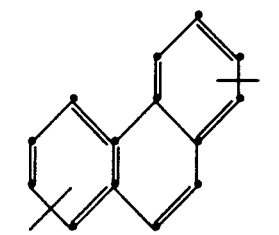

where A = $-\overset{O}{\underset{O}{\overset{\|}{S}}}-$, $-\overset{O}{\underset{\|}{S}}-$ or $-\overset{O}{\overset{\|}{C}}-$ Preferably x is in the range of 0.02 to 0.15.

In both of the above structures, the repeating units having disulfide linkages are defined as corresponding to the excess atoms of sulfur per aromatic ring unit as determined by an appropriate analytical method, such as elemental analysis.

The copoly(phenylene sulfide) of this invention is prepared by reacting a diiodo aromatic compound which contributes the aromatic radical, diiodobenzene and sulfur in the same manner as disclosed in U.S. patent application Ser. No. 117,722, herein incorporated by reference.

Both the diiodobenzene and the diiodo aromatic compound which contributes the aromatic radical may be prepared by methods well known in the art, such as liquid- or gas-phase iodination reactions.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6–12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%–100%, although sulfur having a lower degree of purity may be used. This lack of sensitivity to the presence of impurities in the sulfur is advantageous to the present process when used as a commerical process since highly purified sulfur is not required and the associated expense is not incurred.

In the process used to prepare the polymer of this invention sulfur reacts with both diiodobenzene and the diiodo aromatic compound which contributes to the aromatic radical eliminating elemental iodine and forming the polymer.

The formation of polymer is not sensitive to the relative stoichiometry of the diiodobenzene and sulfur. Accordingly, an excess of sulfur or an excess of diiodobenzene may be used in the polymerization process. When excess sulfur is used, some disulfide linkages are observed in the polymer. Decreasing amounts of sulfur result in decreasing levels of disulfide linkages in the final polymer. When the diiodobenzene is present in excess, polymerization to high polymer can still occur if the excess diiodobenzene is removed during final polymerization.

The polymerization reaction is preferably carried out in the absence of solvent by merely heating and reacting the sulfur and diiodoaromatic compound Under these conditions, the diiodobenzene and the diiodo aromatic compound which contributes the aromatic radical act as solvents for the sulfur which is melted, thereby forming a substantially homogeneous solution enabling a facile and complete reaction. Catalysis of the reaction may be accomplished by inclusion of nitro aromatic compounds as disclosed in U.S. Pat. No. 4,792,600, amino aromatic compounds as disclosed in U.S. patent application Ser. No. 220,404, or iron and/or its compounds as disclosed in U.S. patent application Ser. No. 246,902.

In another embodiment, the diiodobenzene and the diiodo aromatic compound which contributes the aromatic radical can be dissolved in an organic solvent which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodo compounds which are being polymerized. Thus, for example, in the polymerization of diiodobenzene and diiodobiphenyl with sulfur, one might use benzene, toluene or naphthalene as a solvent.

A significant aspect of this invention is the absence of cross-linking during the melt polymerization processes. The polymers of this invention are substantially linear and have excellent film forming properties.

During the polymerization reaction between the diiodobenzene, the diiodo aromatic compound which contributes the aromatic radical and sulfur, elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. Particularly advantageous is the use of a sweep of oxygen containing gas as disclosed in U.S. patent application Ser. No. 119,711. The elemental iodine may be collected and used as a commercial product or as a reactant for further chemical processes. The present reaction, therefore, does not result in wasted reaction products since both the polymer and elemental iodine are useful commerical chemical products.

The final phase of the polymeriztion reaction is generally conducted at a temperature above about 300° C. There is no particular upper temperature limit on the polymerization reaction, which may be conducted at any temperature below the decomposition temperature of the diiodo compounds. For most polymerization reactions, temperatures in the range of about 300°–400° C. will be suitable, although for particular diiodoaromatic compounds temperatures in excess of 400° C. may be used. Particularly preferred temperature ranges are from about 325°–375° C.

The final phase of the reaction is generally conducted for a period of one-half hour or less but can be continued for longer times. The exact reaction time will depend on the diiodo compounds, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however, agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodo compounds and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

In this reaction, it is also advantageous to perform the polymerization in the presence of a sweep of oxygen-containing gas as disclosed in U.S. patent application Ser. No. 196,711.

Additionally, for certain applications, termination of the copolymer may be desirable for control of the molecular weight and melt stability as disclosed in U.S. patent application Ser. No. 219,123.

The useful range of diiodo aromatic units ranges from about 2 to about 25 mol % with the preferred range being from about 2 to 15 mol %. In this range, the copolymers are amorphous upon cooling from the bulk but yet capable of being readily oriented to produce tough, crystalline articles.

The polymer of this invention is useful for preparation of various shaped articles such as pellets, films and molded articles. The polymer can be prepared into these shaped articles by conventional processes, such as injection molding, and melt extrusion.

The copolymer of this invention can be crystallized by orientation according to techniques well known in the art. For example, elongating at temperatures in the range of from the glass transition temperature to no more than 50° C. above the glass transition temperature at a rate not less than 10% per min will result in the film or fiber crystallizing and thereby increasing in strength and modulus. More preferably, the orientation temperature range can be from 5° C. above the glass transition temperature to no more than 30° C. above the glass transition temperature and the elongation rate is not less than 100% per min. The maximum rate of elongation for the orientation process for the copolymers of this invention should not exceed 20,000% per min and more preferably should not exceed 5,000% per min.

EXAMPLES

Example 1

This example illustrates the preparation of a polymer of this invention.

Into a 500 ml 3-neck round bottom flask are weighed the following: 32 g sulfur (0.998 mol), p-diiodobenzene, 328 g (0.99 mol), 81.2 g 4,4'-diiodobiphenyl (0.20 mol, 20 mol % copolymer units), and 0.8 g of 1,3-diiodo-5-nitrobenzene catalyst. The flask was fitted with a 350 mm long Vigreux column, a mechanical stirrer through the center joint, and an inlet tube for a slow air sweep (sweep rate 0.1 ft³/hr). The column was attached via a distrillation head and a takeoff tube to a distillation receiver which was cooled in dry ice. The receiver was connected to a vacuum source. The flask was maintained at 200 torr pressure and immersed in a metal bath controlled at 230° C. It was held under these conditions for 2.5 hr, at which time the bath temperature was raised to 240° C. After 1.5 hr, the pressure was reduced to 120 torr, held for 30 min and then reduced to 60 torr where it was held for an additional 30 min. The bath temperature was then increased to 250° C., the pressure reduced to 0.3 torr and the melt condensed for 1 hr. The bath was raised then to 350° C. and held there for 30 min. The reaction flask was removed from the metal bath, repressurrized with nitrogen, and allowed to cool under nitrogen. The polymer yield was determined by weighin the flask assembly after the reaction and subtracting that weight from the total weight of the assembly plus reactants prior to the start of the reaction. The yield ws 98.9% of polymer with a very high melt viscosity which remained amorphous upon cooling. The Tg (by DSC) was 125° C. The polymer was very tough.

Example 2

The preparation of Example 1 was repeated but using a different ratio of the two dioodoaromatic monomers. In this experiment p-diiodobenzene, 246 g (0.75 mol, 20 mol % excess overall, 23.8 mol % excess of this compound) and 162.3 g 4,4'-diiodobiphenyl (0.40 mol, 40 mol % copolymer units) were employed. The same heating and pressure schedule were employed as in Example 1 except that the bath temperature was raised from 250° C. to 300° C. and after 21 min to 350° C. and held there for 29 min. Polymer yield was 98.6% and the polymer was observed to be amorphous upon cooling. The Tg (by DSC) was 150° C. and the polymer was tough.

Example 3

The preparation of Example 1 was repeated but using a different ratio of the two dioodoaromatic monomers. In this experiment p-diiodobenzene, 389.5 g (1.18 mol) and 20.3 g 4,4''-diiodobipheny (0.05 mol, 5 mol % copolymer units) were employed. The same heating and pressure schedule were employed as in Example 1 except that the bath temperature was raised from 250° C. directly to 350° C. held there for 30 min. The polymer was observed to be amorphous upon cooling. The Tg (by DSC) was 110° C. and the polymer was tough.

Example 4

The preparation of Example 1 was repeated but using a different ratio of the two dioodoaromatic monomers. In this experiment p-diiodobenzene, 369 g (1.12 mol) and 40.6 g 4,4'-diiodobiphenyl (0.10 mol, 10 mol % copolymer units) were employed. The same heating and pressure schedule were employed as in Example 1 except that the bath temperature was raised from 250° C. directly to 350° C. and held there for 30 min. The polymer was observed to be amorphous upon cooling. The Tg (by DSC) was 110° C. and the polymer was tough.

Example 5

This example illustrates the range of aromatic radicals which makes the copolymer of this invention suitable for oriented objects, such as film and fiber.

Films of the copolymers of Examples 1 to 4 were pressed at a temperature of 375° C. using a 0.020 inch thickness shim for the pressing. Strips of film 0.25 in wide were cut and the strips held over a heat gun followed by stretching by hand. For samples showing desirable behavior, the film width and thickness reached a seemingly constant value that could not easily be reduced by further attempted stretching and is referred to as self-leveling behavior. The results of the tests are as follows:

| Mole % diiodo-biphenyl | self-leveling? | Tch, °C. | 1st cycle DSC | | |
|---|---|---|---|---|---|
| | | | cal/g | Tm, °C. | cal/g |
| 5 | yes | 131 | 0.82 | 237 | 4.82 |
| 10 | yes | 156 | 0.68 | 219 | 1.38 |
| 20 | yes | — | — | — | — |
| 40 | no | — | — | — | — |

The dashes in the above table means a transition which was not detected.

We claim:

1. A process for producing elemental iodine and a copoly(arylene sulfide) of repeating units corresponding to the structure

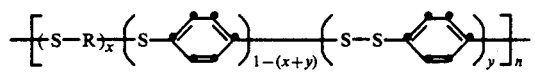

wherein y is in the range of 0.005 to 0.15, x is in the range of 0.02 to 0.25, n is at least 200, and R a divalent radial selected from

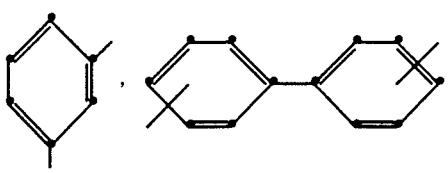

-continued

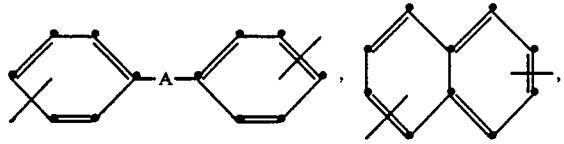

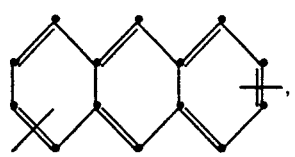

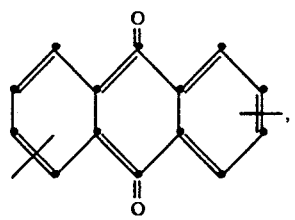

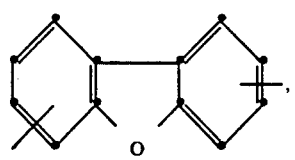

-continued

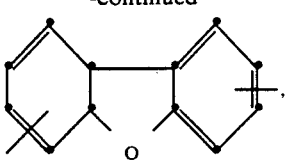

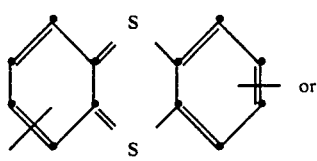 or

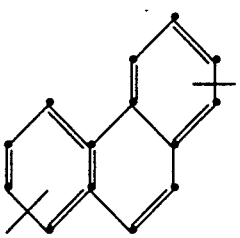

where $A = -\overset{O}{\underset{}{S}}-, -\overset{O}{\underset{O}{S}}- \text{ or } -\overset{O}{\underset{}{C}}-,$ consisting essentially of
(1) reacting at a temperature above about 175° C., a mixture of p-diiodobenzene and an additional diiodoaromatic compound which gives the R unit and elemental sulfur to produce the elemental iodine and the copoly(arylene sulfide), and
(2) recovering the elemental iodine.

2. The process of claim 1 wherein x is in the range of 0.02 to 0.15.

* * * * *